United States Patent
Zhu et al.

(10) Patent No.: US 10,182,376 B2
(45) Date of Patent: Jan. 15, 2019

(54) HANDOVER INTO DYNAMIC TDD UL/DL CONFIGURATION ENABLED CELL AND/OR COMP CELLS

(71) Applicant: QUALCOMM Incorporated, San Diego, CA (US)

(72) Inventors: Xipeng Zhu, Beijing (CN); Chao Wei, Beijing (CN); Wanshi Chen, San Diego, CA (US); Peter Gaal, San Diego, CA (US); Hao Xu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 218 days.

(21) Appl. No.: 15/109,596

(22) PCT Filed: Feb. 10, 2015

(86) PCT No.: PCT/CN2015/072638
§ 371 (c)(1),
(2) Date: Jul. 1, 2016

(87) PCT Pub. No.: WO2015/117569
PCT Pub. Date: Aug. 13, 2015

(65) Prior Publication Data
US 2016/0330659 A1  Nov. 10, 2016

(30) Foreign Application Priority Data
Feb. 10, 2014  (WO) ................ PCT/CN2014/071912

(51) Int. Cl.
*H04W 36/00* (2009.01)
*H04L 1/18* (2006.01)

(52) U.S. Cl.
CPC ....... *H04W 36/0072* (2013.01); *H04L 1/1812* (2013.01); *H04W 36/0061* (2013.01); *H04W 36/0077* (2013.01); *H04W 36/0083* (2013.01)

(58) Field of Classification Search
CPC ......... H04W 36/0061; H04W 36/0072; H04W 36/0077; H04W 36/0083; H04L 1/1812
See application file for complete search history.

(56) References Cited

U.S. PATENT DOCUMENTS

| | | |
|---|---|---|
| 2009/0249153 A1 | 10/2009 | Zhang |
| 2010/0322118 A1 | 12/2010 | Fang et al. |

(Continued)

FOREIGN PATENT DOCUMENTS

| | | |
|---|---|---|
| CN | 103037524 A | 4/2013 |
| CN | 103200577 A | 7/2013 |
| CN | 103248466 A | 8/2013 |

OTHER PUBLICATIONS

3rd Generation Partnership Project: "Technical Specification Group Radio Access Network," Evolved Universal Terrestrial Radio Access (E-UTRA) and Evolved Universal Terrestrial Radio Access Network (E-UTRAN); Overall description; Stage 2 (Release 12); Mobile Competence Centre ; 650. Route Des Lucioles ; F-06921 Sophia-Antipolis Cedex ; France; vol. RAN WG2. No. V12.0.0, Jan. 10, 2014 (Jan. 10, 2014), XP050729408, pp. 1-208. [retrieved on Jan. 10, 2014].

(Continued)

*Primary Examiner* — Jenee Holland
(74) *Attorney, Agent, or Firm* — Qualcomm/Norton Rose Fulbright US LLP

(57) ABSTRACT

Techniques for handover into eIMTA enabled cells are disclosed. In an aspect, a target cell reconfigures RRC connection with a UE after completed handover to enable eIMTA and/or CoMP for the UE. In another aspect, a target cell includes eIMTA configuration information in a han- (Continued)

dover command to a UE. In another aspect, the target cell may estimate a virtual cell identity to generate the eIMTA configuration information and delay scheduling transmissions to the UE by flexible subframes until after handover is complete and the correct eIMTA configuration information confirmed by measurement or else corrected by RRC connection reconfiguration. In other aspects, the target cell may determine the correct virtual cell identity before handover, either by measuring SRS of the UE, or by receiving information in a handover request indicating results of CSI-RS measurement, by the UE, of virtual cells of the target cell.

30 Claims, 12 Drawing Sheets

(56) References Cited

U.S. PATENT DOCUMENTS

| | | | |
|---|---|---|---|
| 2012/0163250 A1* | 6/2012 | Chin | H04W 56/001 370/280 |
| 2012/0257549 A1* | 10/2012 | Chin | H04W 36/14 370/280 |
| 2012/0263045 A1* | 10/2012 | Fauconnier | H04W 72/005 370/242 |
| 2013/0336173 A1 | 12/2013 | Mandil et al. | |
| 2014/0086112 A1* | 3/2014 | Stern-Berkowitz | H04W 72/1289 370/280 |
| 2014/0307598 A1* | 10/2014 | Mizusawa | H04W 72/0446 370/280 |
| 2015/0029910 A1* | 1/2015 | He | H04W 4/70 370/280 |
| 2015/0098380 A1* | 4/2015 | Tseng | H04W 72/082 370/311 |
| 2015/0109946 A1* | 4/2015 | Sharma | H04L 5/14 370/252 |
| 2015/0155979 A1* | 6/2015 | Guo | H04L 1/1812 370/280 |
| 2015/0189574 A1* | 7/2015 | Ng | H04W 24/08 370/252 |
| 2015/0289261 A1* | 10/2015 | Oizumi | H04W 72/02 370/329 |
| 2015/0305000 A1* | 10/2015 | Nguyen | H04L 5/14 370/329 |

OTHER PUBLICATIONS

Email Discussion Rapporteur (CATT): "Report of email discussion [84#32] [LTE/eiMTA] RACH Aspects of eiMTA," 3rd Generation Partnership Project (3GPP), Mobile Competence Centre ; 650 Route Des, Lucioles ; F-06921 Sophia-Antipolis Cedex; R2-140064; Feb. 9, 2014 (Feb. 9, 2014), XP050791500, pp. 16 pages. Retrieved from the Internet: URL:http://www.3gpp.org/ftp/Meetings_3GPP_SYNC/RAN2/Docs/ [retrieved on Feb. 9, 2014].
Intel Corporation: "Signaling mechanism for TDD UL/DL reconfiguration," 3rd Generation Partnership Project (3GPP), Mobile Competence Centre ; R1-132926; 650, Route Des Lucioles ; F-06921 Sophia-Antipolis Cedex ; France; vol. RAN WG1, no. Barcelona, Spain; Aug. 19, 2013-Aug. 23, 2013; Aug. 10, 2013 (Aug. 10, 2013), XP050716166, pp. 5 pages. Retrieved from the Internet: URL:http://www.3gpp.org/ftp/tsg_ran/WG1_RL1/TSGR1_74/Docs/ [retrieved on Aug. 10, 2013].
International Search Report and Written Opinion—PCT/CN2014/071912—ISA/EPO—dated Nov. 15, 2014.
International Search Report and Written Opinion—PCT/CN2015/072638—ISA/EPO—dated May 13, 2015.
Qualcomm Incorporated: "Handover into eiMTA cell," 3rd Generation Partnership Project (3GPP), Mobile Competence Centre; R2-141605 Handover into EIMTA Cell V1.1; 650, Route Des Lucioles ; F-06921 Sophia-Antipolis Cedex; France; vol. RAN WG2, no. Valencia. Spain; Mar. 31, 2014-Apr. 4, 2014; Mar. 22, 2014 (Mar. 22, 2014), XP050792753, pp. 4 pages. Retrieved from the Internet: URL:http://www.3gpp.org/ftp/Meetings_3GPP_SYNC/RAN2/Docs/ [retrieved on Mar. 22, 2014].
Samsung: "Discussion on RAN2 issues in TDD eiMTA systems," 3rd Generation Partnership Project (3GPP), Mobile Competence Centre ; R2-133428; 650, Route Des Lucioles ; F-06921 Sophia-Antipolis Cedex; France; vol. RAN WG2. no. Ljubljana. Slovenia: Oct. 7, 2013-Oct. 11, 2013; Sep. 27, 2013 (Sep. 27, 2013), XP050719042, pp. 3 pages. Retrieved from the Internet: URL:http://www.3gpp.org/ftp/tsg_ran/WG2_RL2/TSGR2_83bis/Docs/ [retrieved on Sep. 27, 2013].
Sharp., "Remaining issues for explicit L1 reconfiguration signaling," 3rd Generation Partnership Project (3GPP), Mobile Competence Centre ; R1-135727; 650, Route Des Lucioles ; F-06921 Sophia-Antipolis Cedex; France, vol. RAN WG1, no. San Francisco, USA; Nov. 11, 2013-Nov. 15, 2013 (Nov. 13, 2013), XP050735378, pp. 1-6 pages. Retrieved from the Internet: URL:http://www.3gpp.org/ftp/Meetings_3GPP_SYNC/RAN/RAN1/Docs/ [retrieved on Nov. 13, 2013].
Supplementary European Search Report—EP15746468—Search Authority—Munich—Jul. 28, 2017.
3GPP TS 36.300 V12.0.0 (Dec. 2013), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), pp. 64-68.
Qualcomm Incorporated: "RAN2 aspects of eIMTA", 3GPP TSG RAN WG2 #83bis R2-133533, Sep. 28, 2013, 8 Pages, URL:http://www.3gpp.org/ftp/tsg_ran/WG2_RL2/TSGR2_83bis/Docs/R2-133533.zip.

* cited by examiner

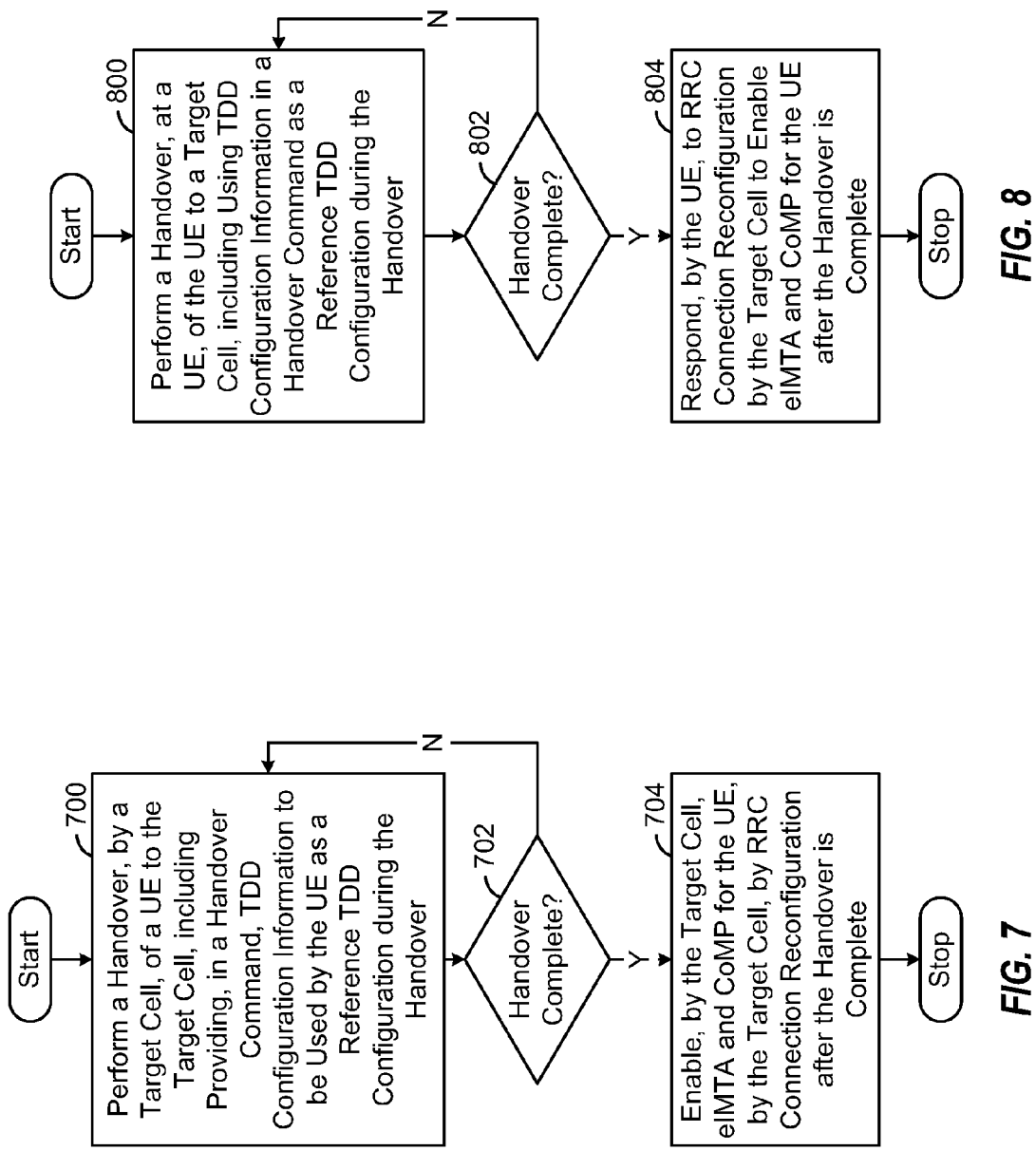

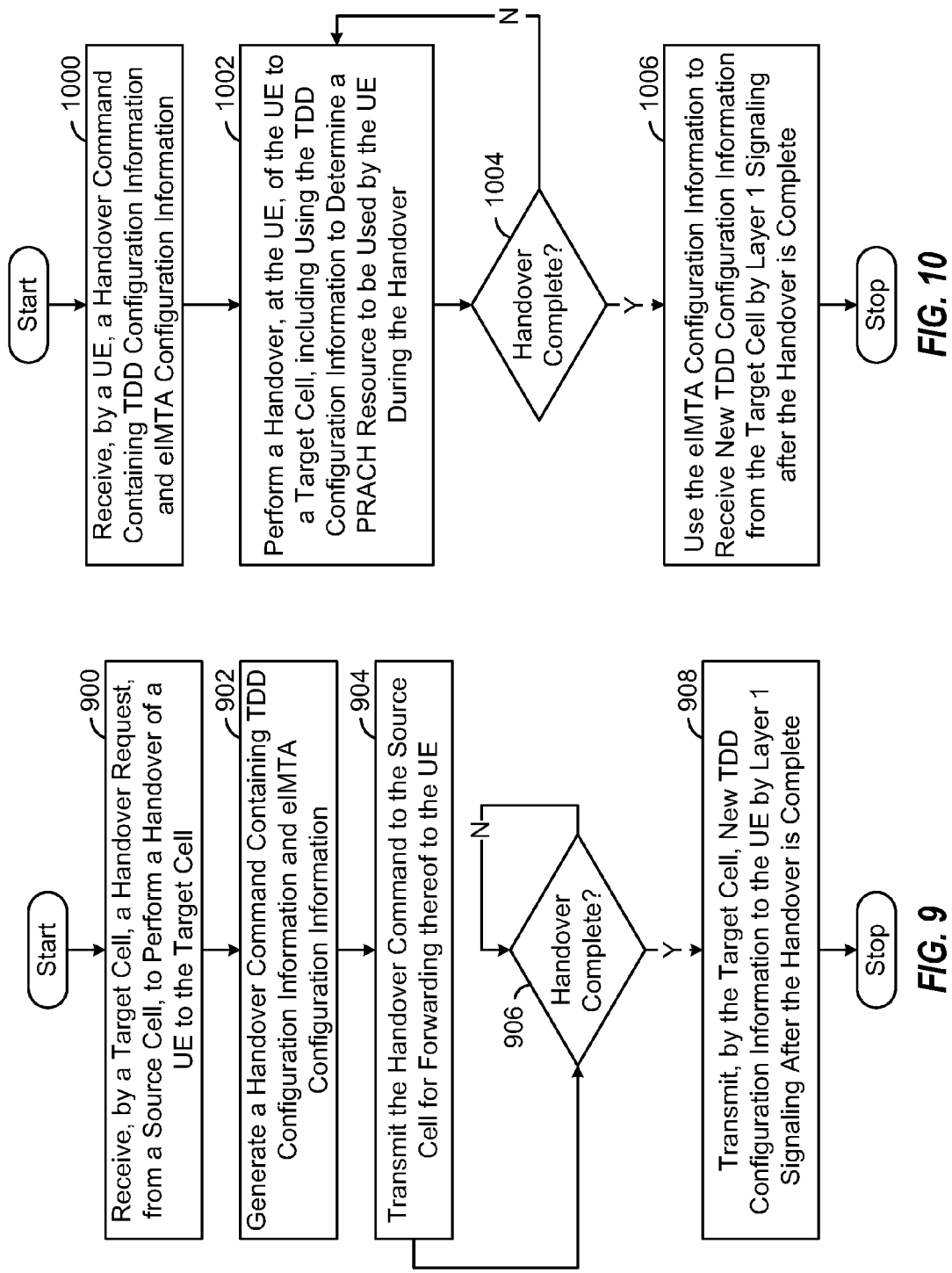

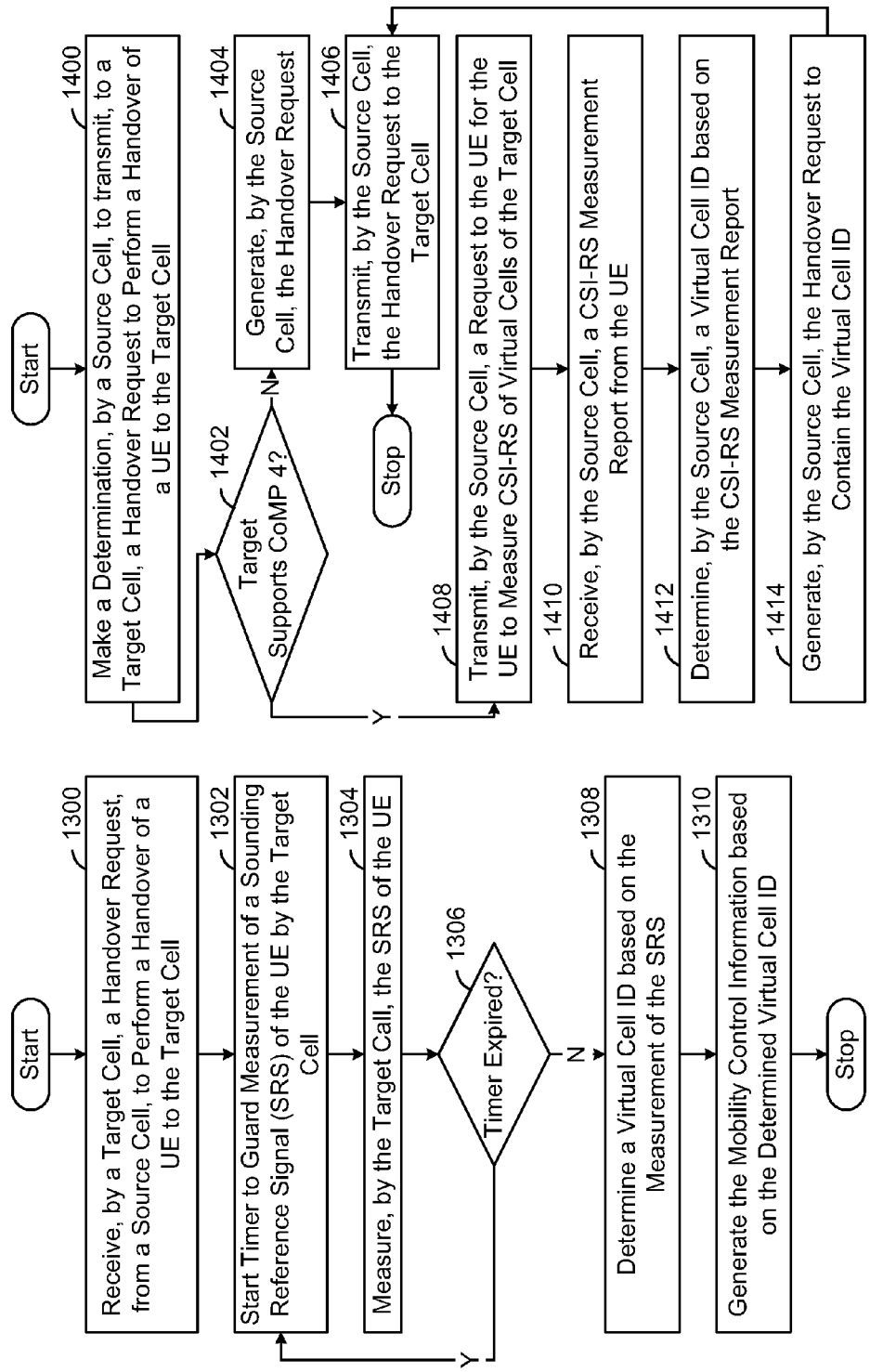

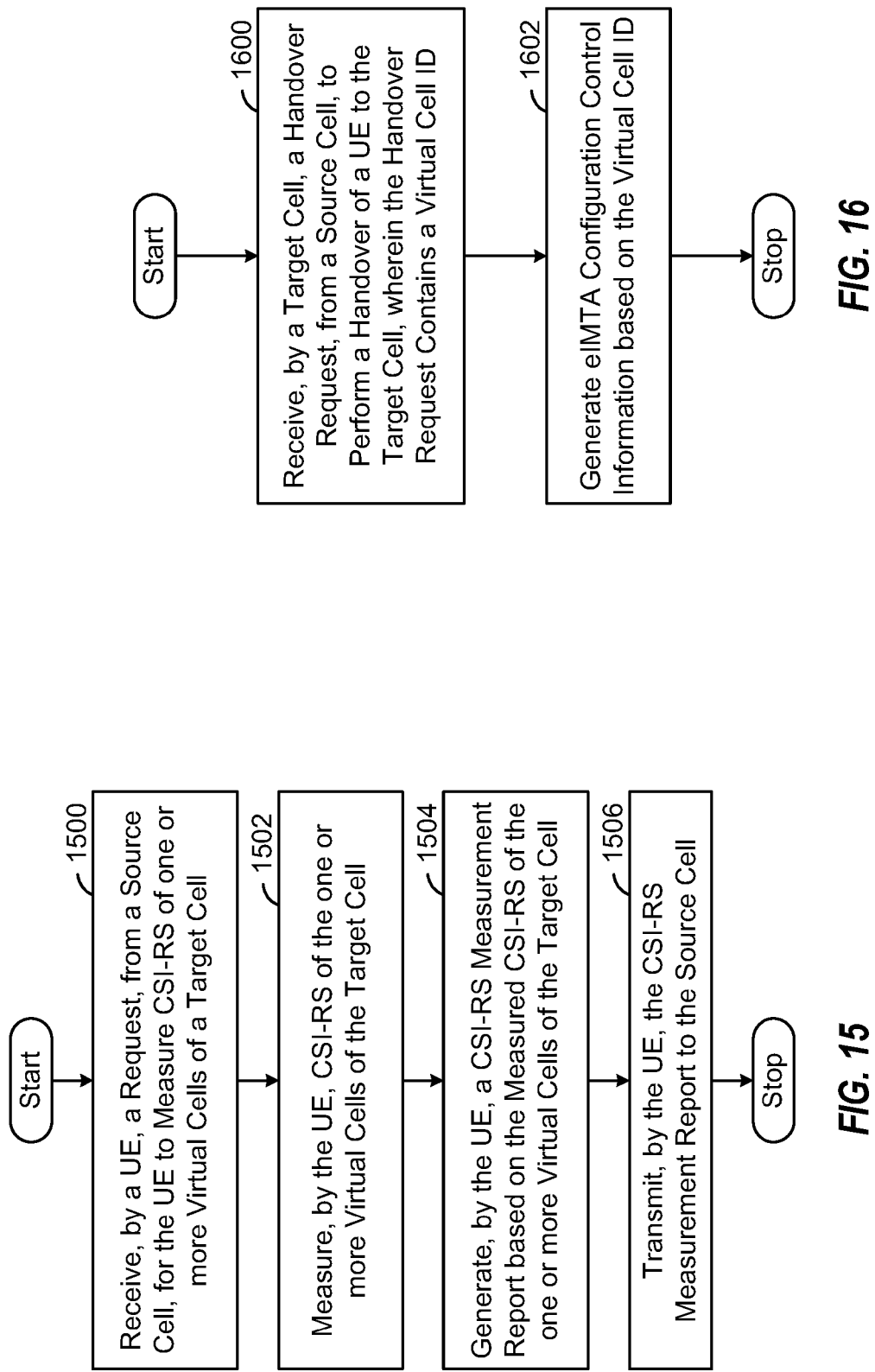

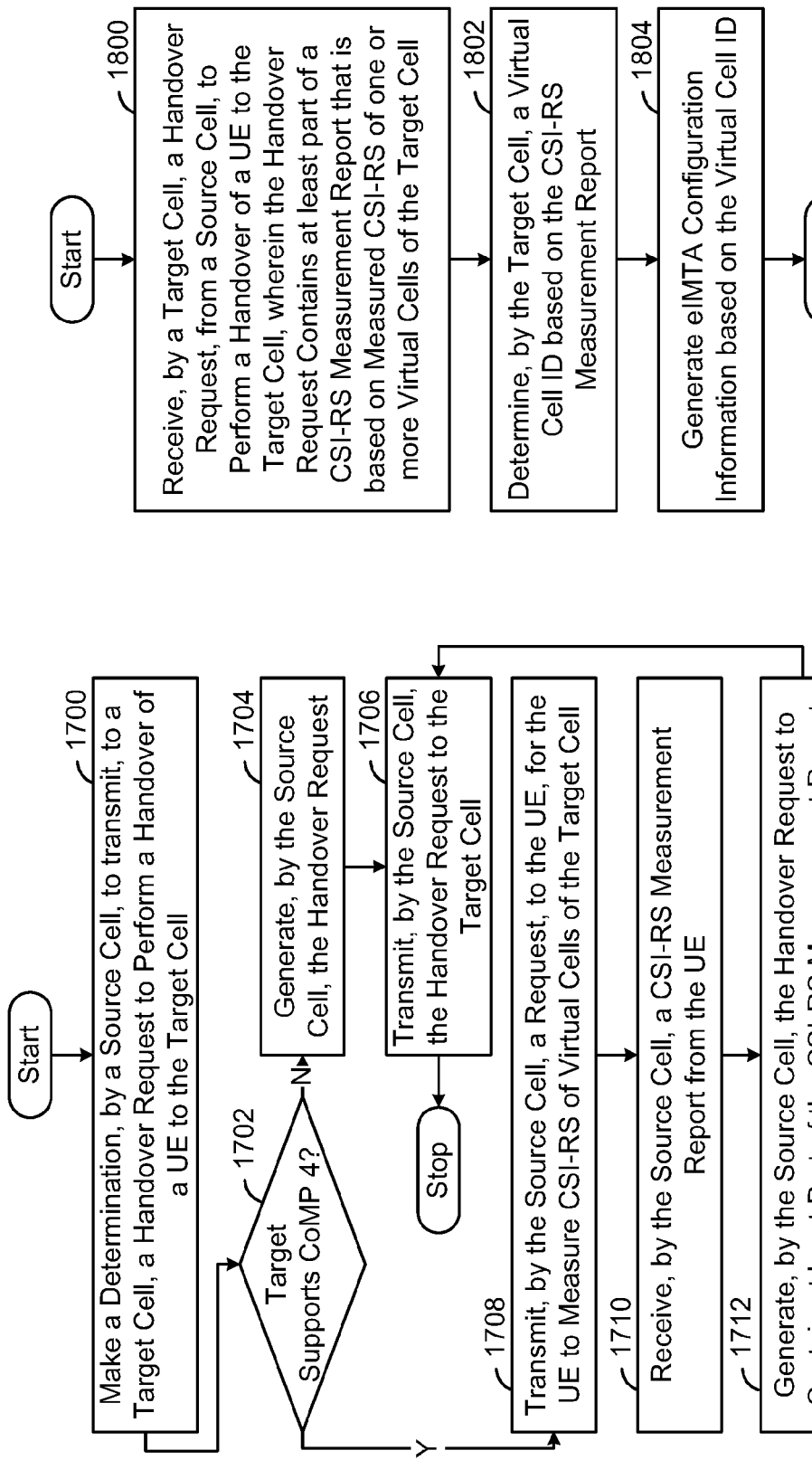

HANDOVER INTO DYNAMIC TDD UL/DL CONFIGURATION ENABLED CELL AND/OR COMP CELLS

BACKGROUND

Field

Aspects of the present disclosure relate generally to wireless communication systems, and more particularly, to handover into dynamic TDD UL/DL configuration enabled cells and/or CoMP cells.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

Enhanced interference management and traffic adaption (eIMTA) is a technology presently under development for wireless communications systems. One goal of eIMTA is to enable dynamic time division duplex (TDD) uplink/downlink (UL/DL) configuration change for traffic adaption. Another goal of eIMTA is to provide interference mitigation with TDD UL/DL reconfiguration.

TDD configuration information is typically supplied in system information block 1 (SIB1). This TDD configuration information may be used by legacy and idle UEs. This TDD configuration information may also be used by all UEs as a reference configuration for Hybrid Automatic Repeat Requests (HARQ) timeline of UL transmission.

In eIMTA, new TDD configuration information may be sent to a UE by explicit Layer 1 (L1) signaling addressed by a group common radio network temporary identifier (RNTI). The L1 signaling to a UE of the new TDD configuration information can change the TDD configuration as often as once every radio frame.

Part of the TDD configuration information may be DL reference configuration information. UEs may use the DL reference configuration to determine the HARQ timeline of DL transmission. This DL reference configuration information may also be changed by the L1 signaling as often as once every radio frame.

SUMMARY

Techniques for handover into dynamic TDD UL/DL configuration enabled cells and/or CoMP cells are described herein.

In an aspect, a method for wireless communications includes generating enhanced interference mitigation and traffic adaptation (eIMTA) configuration information, by a target cell, for a user equipment (UE) to receive new TDD configuration information from the target cell by Layer 1 signaling. The method additionally includes generating, by the target cell, a handover command to perform a handover of the UE to the target cell, wherein the handover command contains Time Division Duplex (TDD) configuration information and the eIMTA configuration information. The method also includes transmitting, by the target cell, the handover command. The method further includes transmitting, by the target cell, the new TDD configuration information to the UE by Layer 1 signaling after the handover is complete.

In another aspect, a method for wireless communications includes receiving, by a user equipment (UE), a handover command to perform a handover of the UE to a target cell, wherein the handover command contains Time Division Duplex (TDD) configuration information and enhanced interference mitigation and traffic adaptation (eIMTA) configuration information for the UE to receive new TDD configuration information from the target cell by Layer 1 signaling. The method additionally includes employing, by the UE, the TDD configuration information to determine a Physical Random Access Channel (PRACH) resource to be used by the UE during the handover. The method also includes employing, by the UE, the eIMTA configuration information to receive the new TDD configuration information from the target cell by the Layer 1 signaling after the handover is complete.

In another aspect, a method for wireless communications includes determining, by a source cell, to transmit, to a target cell, a handover request to perform a handover of a user equipment (UE) to the target cell. The method additionally includes transmitting, by the source cell, a request, to the UE, for the UE to measure one or more Channel State Information-Reference Signal (CSI-RS) of one or more virtual cells of the target cell. The method also includes receiving, by the source cell, a CSI-RS measurement report from the UE.

In another aspect, a method for wireless communications includes receiving, by a user equipment (UE), a request, from a source cell, for the UE to measure one or more Channel State Information-Reference Signal (CSI-RS) of one or more virtual cells of a target cell. The method additionally includes measuring, by the UE, CSI-RS of the one or more virtual cells of the target cell in response to the request.

In another aspect, a method for wireless communications includes performing a handover, by a target cell, of a user equipment (UE) to the target cell. The method additionally includes performing, by the target cell, radio resource control (RRC) connection reconfiguration after the handover is complete, thereby enabling at least one of enhanced interference mitigation and traffic adaptation (eIMTA) or coordinated multipoint (CoMP) for the UE.

In another aspect, a method for wireless communications includes performing a handover, by a user equipment (UE), of the UE to a target cell. The method additionally includes responding, by the UE, to radio resource configuration (RRC) connection reconfiguration, by the target cell, after the handover is complete, wherein the RRC connection reconfiguration enables at least one of enhanced interference mitigation and traffic adaptation (eIMTA) or coordinated multipoint (CoMP) for the UE.

In another aspect, an apparatus for wireless communications includes means for generating enhanced interference mitigation and traffic adaptation (eIMTA) configuration information, by a target cell, for a user equipment (UE) to receive new TDD configuration information from the target cell by Layer 1 signaling. The apparatus additionally includes means for generating, by the target cell, a handover command to perform a handover of the UE to the target cell, wherein the handover command contains Time Division Duplex (TDD) configuration information and the eIMTA configuration information. The apparatus also includes means for transmitting, by the target cell, the handover command. The apparatus further includes means for transmitting, by the target cell, the new TDD configuration information to the UE by Layer 1 signaling after the handover is complete.

In another aspect, an apparatus for wireless communications includes means for receiving, by a user equipment (UE), a handover command to perform a handover of the UE to a target cell, wherein the handover command contains Time Division Duplex (TDD) configuration information and enhanced interference mitigation and traffic adaptation (eIMTA) configuration information for the UE to receive new TDD configuration information from the target cell by Layer 1 signaling. The apparatus additionally includes means for employing, by the UE, the TDD configuration information to determine a Physical Random Access Channel (PRACH) resource to be used by the UE during the handover. The apparatus also includes means for employing, by the UE, the eIMTA configuration information to receive the new TDD configuration information from the target cell by the Layer 1 signaling after the handover is complete.

In another aspect, an apparatus for wireless communications includes means for determining, by a source cell, to transmit, to a target cell, a handover request to perform a handover of a user equipment (UE) to the target cell. The apparatus additionally includes means for transmitting, by the source cell, a request, to the UE, for the UE to measure one or more Channel State Information-Reference Signal (CSI-RS) of one or more virtual cells of the target cell. The apparatus also includes means for receiving, by the source cell, a CSI-RS measurement report from the UE.

In another aspect, an apparatus for wireless communications includes means for receiving, by a user equipment (UE), a request, from a source cell, for the UE to measure one or more Channel State Information-Reference Signal (CSI-RS) of one or more virtual cells of a target cell. The apparatus additionally includes means for measuring, by the UE, CSI-RS of the one or more virtual cells of the target cell in response to the request.

In another aspect, an apparatus for wireless communications includes means for performing a handover, by a target cell, of a user equipment (UE) to the target cell. The apparatus additionally includes means for performing, by the target cell, radio resource control (RRC) connection reconfiguration after the handover is complete, thereby enabling at least one of enhanced interference mitigation and traffic adaptation (eIMTA) or coordinated multipoint (CoMP) for the UE.

In another aspect, an apparatus for wireless communications includes means for performing a handover, by a user equipment (UE), of the UE to a target cell. The apparatus additionally includes means for responding, by the UE, to radio resource configuration (RRC) connection reconfiguration, by the target cell, after the handover is complete, wherein the RRC connection reconfiguration enables at least one of enhanced interference mitigation and traffic adaptation (eIMTA) or coordinated multipoint (CoMP) for the UE.

In another aspect, a computer-readable medium has program code stored thereon. The program code, when executed by a computer, causes the computer to generate enhanced interference mitigation and traffic adaptation (eIMTA) configuration information, by a target cell, for a user equipment (UE) to receive new TDD configuration information from the target cell by Layer 1 signaling. The program code, when executed by a computer, additionally causes the computer to generate, by the target cell, a handover command to perform a handover of the UE to the target cell, wherein the handover command contains Time Division Duplex (TDD) configuration information and the eIMTA configuration information. The program code, when executed by a computer, also causes the computer to transmit, by the target cell, the handover command. The program code, when executed by a computer, further causes the computer to transmit, by the target cell, the new TDD configuration information to the UE by Layer 1 signaling after the handover is complete.

In another aspect, a computer-readable medium has program code stored thereon. The program code, when executed by a computer, causes the computer to receive, by a user equipment (UE), a handover command to perform a handover of the UE to a target cell, wherein the handover command contains Time Division Duplex (TDD) configuration information and enhanced interference mitigation and traffic adaptation (eIMTA) configuration information for the UE to receive new TDD configuration information from the target cell by Layer 1 signaling. The program code, when executed by a computer, additionally causes the computer to employ, by the UE, the TDD configuration information to determine a Physical Random Access Channel (PRACH) resource to be used by the UE during the handover. The program code, when executed by a computer, also causes the computer to employ, by the UE, the eIMTA configuration information to receive the new TDD configuration information from the target cell by the Layer 1 signaling after the handover is complete.

In another aspect, a computer-readable medium has program code stored thereon. The program code, when executed by a computer, causes the computer to determine, by a source cell, to transmit, to a target cell, a handover request to perform a handover of a user equipment (UE) to the target cell. The program code, when executed by a computer, additionally causes the computer to transmit, by the source cell, a request, to the UE, for the UE to measure one or more Channel State Information-Reference Signal (CSI-RS) of one or more virtual cells of the target cell. The program code, when executed by a computer, also causes the computer to receive, by the source cell, a CSI-RS measurement report from the UE.

In another aspect, a computer-readable medium has program code stored thereon. The program code, when executed by a computer, causes the computer to receive, by a user equipment (UE), a request, from a source cell, for the UE to measure one or more Channel State Information-Reference Signal (CSI-RS) of one or more virtual cells of a target cell. The program code, when executed by a computer, additionally causes the computer to measure, by the UE, CSI-RS of the one or more virtual cells of the target cell in response to the request.\

In another aspect, a computer-readable medium has program code stored thereon. The program code, when executed by a computer, causes the computer to perform a handover, by a target cell, of a user equipment (UE) to the target cell. The program code, when executed by a computer, additionally causes the computer to perform, by the target cell, radio resource control (RRC) connection reconfiguration after the handover is complete, thereby enabling at least one of enhanced interference mitigation and traffic adaptation (eIMTA) or coordinated multipoint (CoMP) for the UE.

In another aspect, a computer-readable medium has program code stored thereon. The program code, when executed by a computer, causes the computer to perform a handover, by a user equipment (UE), of the UE to a target cell. The program code, when executed by a computer, additionally causes the computer to respond, by the UE, to radio resource configuration (RRC) connection reconfiguration, by the target cell, after the handover is complete, wherein the RRC connection reconfiguration enables at least one of enhanced interference mitigation and traffic adaptation (eIMTA) or coordinated multipoint (CoMP) for the UE.

In another aspect, an apparatus configured for wireless communication includes at least one processor and a memory coupled to the at least one processor. The at least one processor is configured to generate enhanced interference mitigation and traffic adaptation (eIMTA) configuration information, by a target cell, for a user equipment (UE) to receive new TDD configuration information from the target cell by Layer 1 signaling. The at least one processor is configured to generate, by the target cell, a handover command to perform a handover of the UE to the target cell, wherein the handover command contains Time Division Duplex (TDD) configuration information and the eIMTA configuration information. The at least one processor is also configured to transmit, by the target cell, the handover command. The at least one processor is further configured to transmit, by the target cell, the new TDD configuration information to the UE by Layer 1 signaling after the handover is complete.

In another aspect, an apparatus configured for wireless communication includes at least one processor and a memory coupled to the at least one processor. The at least one processor is configured to receive, by a user equipment (UE), a handover command to perform a handover of the UE to a target cell, wherein the handover command contains Time Division Duplex (TDD) configuration information and enhanced interference mitigation and traffic adaptation (eIMTA) configuration information for the UE to receive new TDD configuration information from the target cell by Layer 1 signaling. The at least one processor is additionally configured to employ, by the UE, the TDD configuration information to determine a Physical Random Access Channel (PRACH) resource to be used by the UE during the handover. The at least one processor is further configured to employ, by the UE, the eIMTA configuration information to receive the new TDD configuration information from the target cell by the Layer 1 signaling after the handover is complete.

In another aspect, an apparatus configured for wireless communication includes at least one processor and a memory coupled to the at least one processor. The at least one processor is configured to determine, by a source cell, to transmit, to a target cell, a handover request to perform a handover of a user equipment (UE) to the target cell. The at least one processor is additionally configured to transmit, by the source cell, a request, to the UE, for the UE to measure one or more Channel State Information-Reference Signal (CSI-RS) of one or more virtual cells of the target cell. The at least one processor is also configured to receive, by the source cell, a CSI-RS measurement report from the UE.

In another aspect, an apparatus configured for wireless communication includes at least one processor and a memory coupled to the at least one processor. The at least one processor is configured to receive, by a user equipment (UE), a request, from a source cell, for the UE to measure one or more Channel State Information-Reference Signal (CSI-RS) of one or more virtual cells of a target cell. The at least one processor is additionally configured to measure, by the UE, CSI-RS of the one or more virtual cells of the target cell in response to the request.

In another aspect, an apparatus configured for wireless communication includes at least one processor and a memory coupled to the at least one processor. The at least one processor is configured to perform a handover, by a target cell, of a user equipment (UE) to the target cell. The at least one processor is additionally configured to perform, by the target cell, radio resource control (RRC) connection reconfiguration after the handover is complete, thereby enabling at least one of enhanced interference mitigation and traffic adaptation (eIMTA) or coordinated multipoint (CoMP) for the UE.

In another aspect, an apparatus configured for wireless communication includes at least one processor and a memory coupled to the at least one processor. The at least one processor is configured to perform a handover, by a user equipment (UE), of the UE to a target cell. The at least one processor is additionally configured to respond, by the UE, to radio resource configuration (RRC) connection reconfiguration, by the target cell, after the handover is complete, wherein the RRC connection reconfiguration enables at least one of enhanced interference mitigation and traffic adaptation (eIMTA) or coordinated multipoint (CoMP) for the UE.

Various aspects and features of the disclosure are described in further detail below.

BRIEF DESCRIPTION OF THE DRAWINGS

FIG. 7 is a block diagram illustrating example blocks of a wireless communication process according to an aspect of the present disclosure;

FIG. 8 is a block diagram illustrating example blocks of a wireless communication process according to an aspect of the present disclosure;

FIG. 9 is a block diagram illustrating example blocks of a wireless communication process according to an aspect of the present disclosure;

FIG. 10 is a block diagram illustrating example blocks of a wireless communication process according to an aspect of the present disclosure;

FIG. 13 is a block diagram illustrating example blocks of a wireless communication process according to an aspect of the present disclosure;

FIG. 14 is a block diagram illustrating example blocks of a wireless communication process according to an aspect of the present disclosure;

FIG. 15 is a block diagram illustrating example blocks of a wireless communication process according to an aspect of the present disclosure;

FIG. 16 is a block diagram illustrating example blocks of a wireless communication process according to an aspect of the present disclosure;

FIG. 17 is a block diagram illustrating example blocks of a wireless communication process according to an aspect of the present disclosure; and FIG. 18 is a block diagram illustrating example blocks of a wireless communication process according to an aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
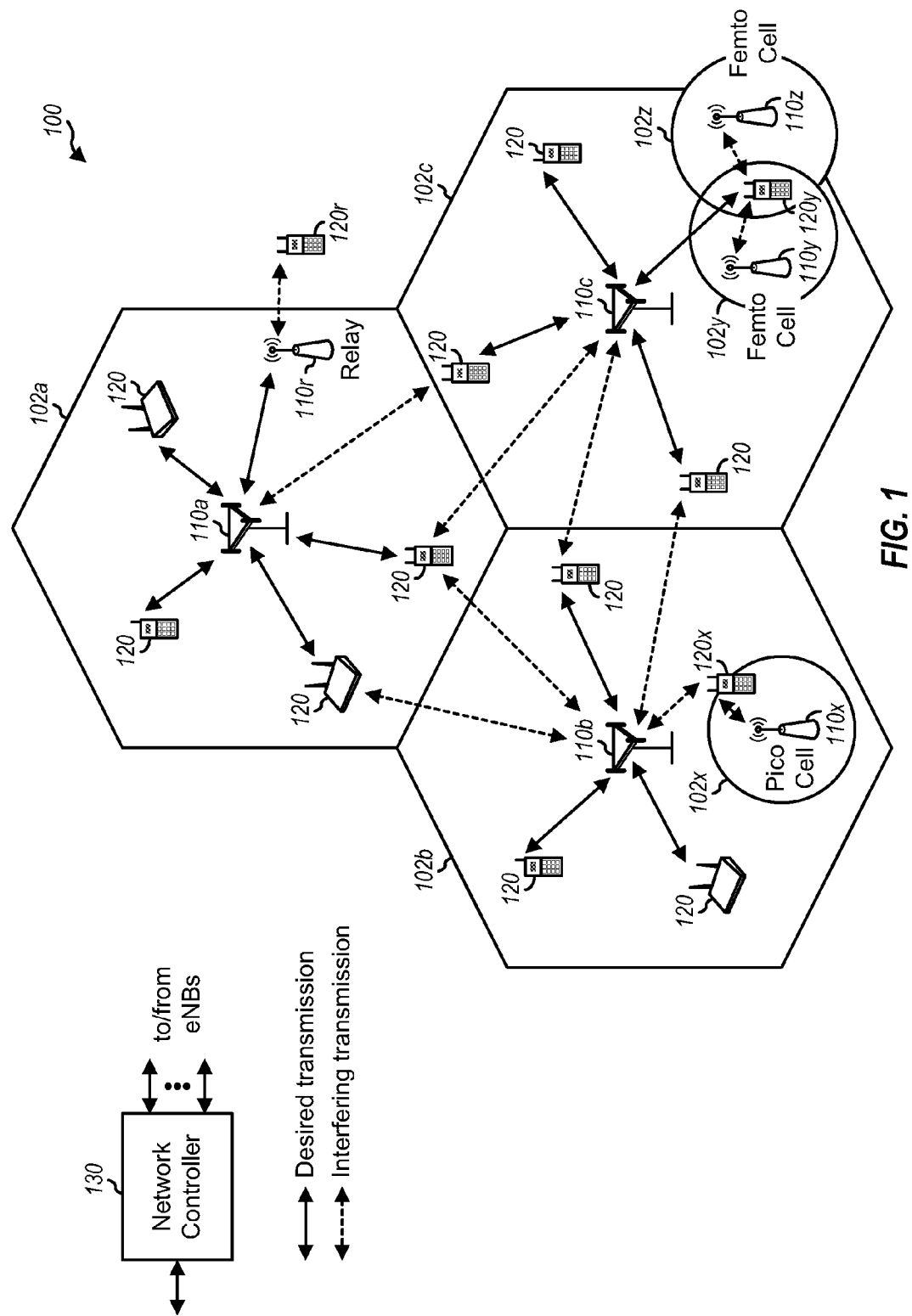
FIG. 1 is a block diagram illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x serving a UE 120x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a smart phone, a handheld device, a laptop computer, a tablet, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
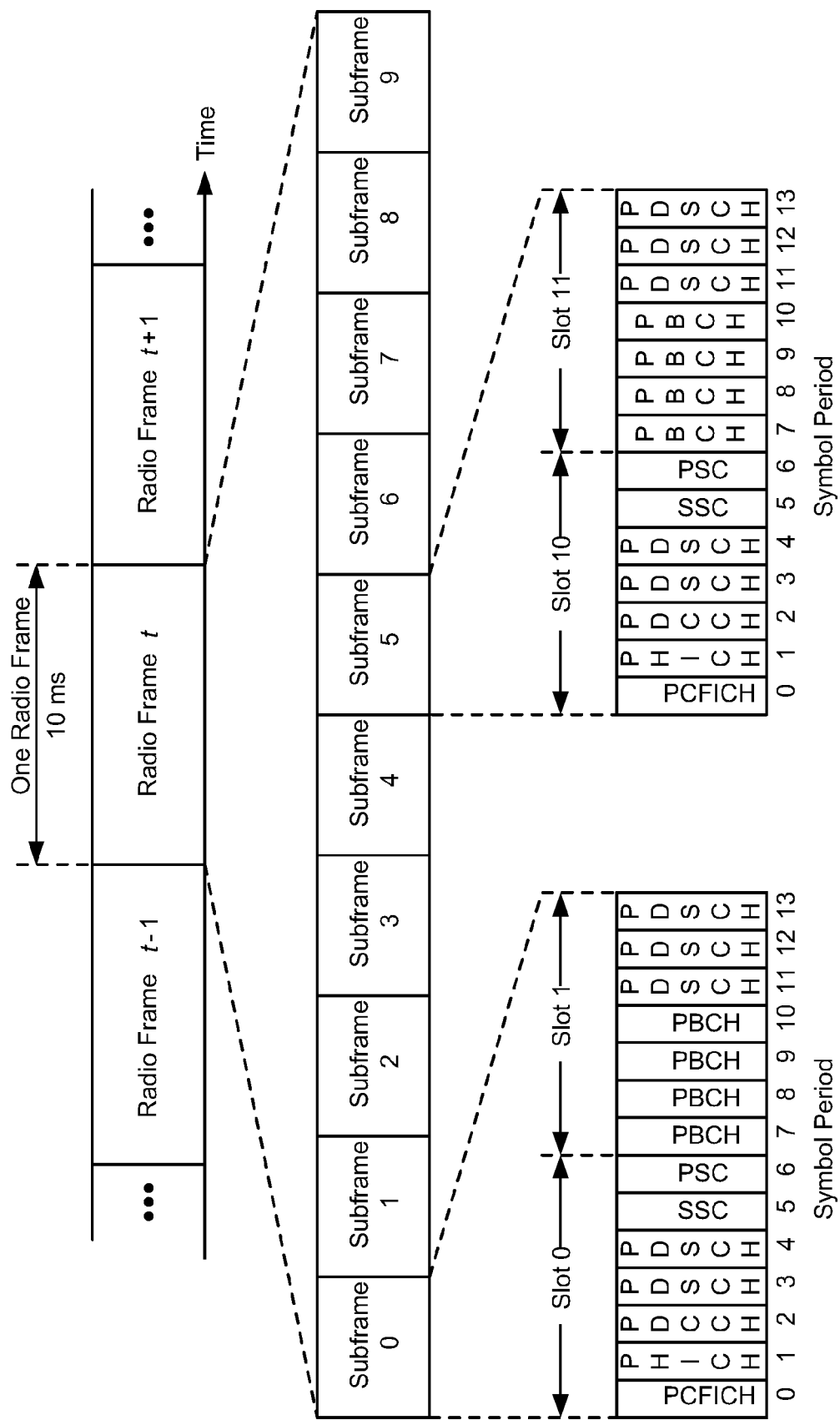
FIG. 2 is a block diagram illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
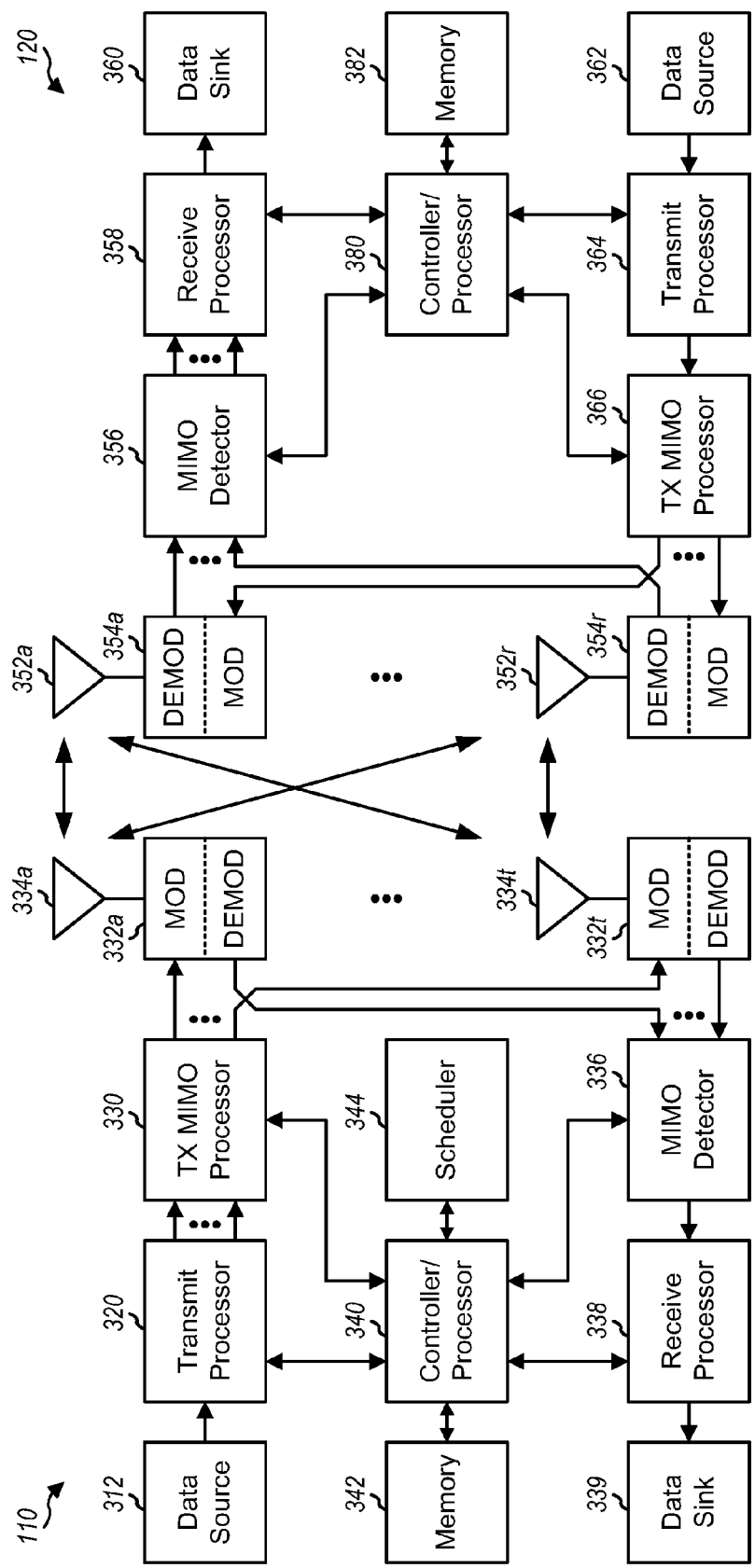
FIG. 3 is a block diagram illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNodeB 110*c* in FIG. 1, and the UE 120 may be the UE 120*y*. The eNodeB 110 may be equipped with antennas 334*a* through 334*t*, and the UE 120 may be equipped with antennas 352*a* through 352*r*.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a transmit MIMO processor 366 if applicable, further processed by the modulators 354a through 354r (e.g., for SC-FDM, etc.), and transmitted to the eNodeB 110. At the eNodeB 110, the uplink signals from the UE 120 may be received by the antennas 334, processed by the demodulators 332a through 332t, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The processor 380 and/or other processors and modules at the UE 120 may also perform or direct the execution of the functional blocks illustrated in FIGS. 4-8, and/or other processes for the techniques described herein. The memories 342 and 382 may store data and program codes for the eNodeB 110 and the UE 120, respectively. A scheduler 344 may schedule UEs for data transmission on the downlink and/or uplink.

As previously noted, enhanced interference management and traffic adaption (eIMTA) is a technology presently under development for wireless communications systems. One goal of eIMTA is to enable dynamic time division duplex (TDD) uplink/downlink (UL/DL) configuration change for traffic adaption. Another goal of eIMTA is to provide interference mitigation with TDD UL/DL reconfiguration.

TDD configuration information is typically supplied in system information block 1 (SIB1). This TDD configuration information may be used by legacy and idle UEs. This TDD configuration information may also be used by all UEs as a reference configuration for Hybrid Automatic Repeat Requests (HARQ) timeline of UL transmission.

In eIMTA, new TDD configuration information may be sent to a UE by explicit Layer 1 (L1) signaling addressed by a group common radio network temporary identifier (RNTI). The L1 signaling to a UE of the new TDD configuration information can change the TDD configuration as often as every radio frame.

Part of the TDD configuration information may be DL reference configuration information. UEs may use the DL reference configuration to determine the HARQ timeline of DL transmission. This DL reference configuration information may also be changed by the L1 signaling as often as every radio frame.

Figure 4:
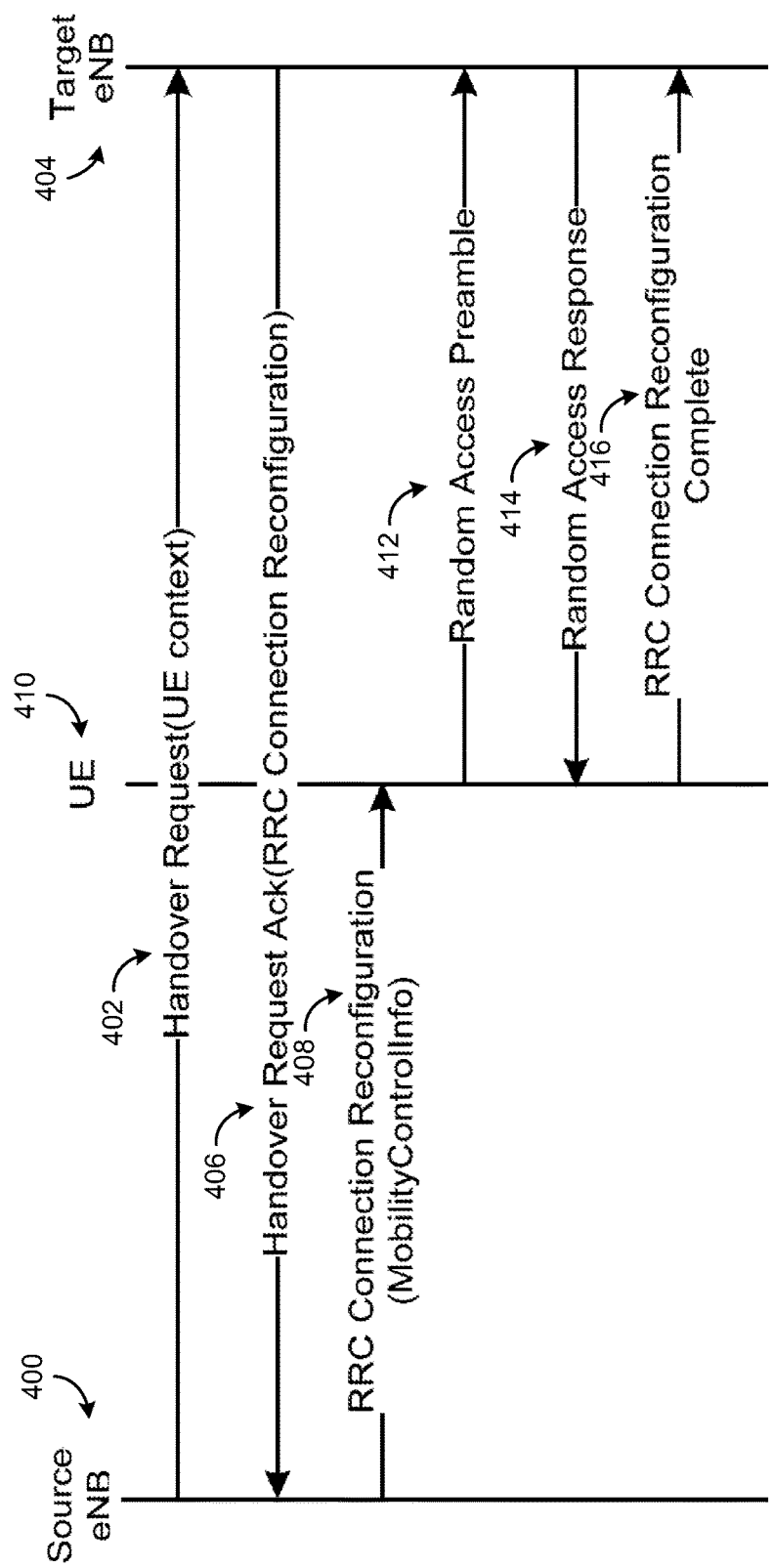
FIG. 4 is a timing diagram illustrating signaling during a handover procedure in a wireless communications system according to an aspect of the present disclosure.

FIG. 4 shows an example of signaling during handover of a UE 410 from a source cell 400 to a target cell 404. For example, the target cell 400 may send a handover request 402 containing UE context information to the target cell 404. The target cell 404 may then decide to perform the handover of the UE 410 to the target cell 404 and respond to the source cell 400 with a handover command 406. The handover command 406 may be a handover request acknowledgment message containing RRC connection reconfiguration information. The source cell 400 may forward the handover command 406 to the UE 410 as an RRC connection reconfiguration message 408 containing mobility control information. This mobility control information may contain TDD configuration information provided by the target cell 404 in the handover command 406.

The UE 410 may follow the TDD configuration information for all of the operations in the target cell 404 until new TDD configuration information is received in SIB 1. For example, the UE 410 may employ the TDD configuration information received in the handover command 406 to determine a random access channel (RACH) resource and perform handover signaling that begins with transmission, by the UE 410, of a random access preamble 412 to the target cell 404. When the target cell 404 responds with a random access response 414, the UE 408 may respond with an RRC connection complete message 416 to complete the handover.

An issue arises when performing handover to a target cell that is eIMTA enabled. In particular, the TDD configuration information received, by the UE, in the handover command may already be invalid due to rapid TDD configuration change at the target cell. This issue may be problematic for several reasons. For example, the handover signaling involving the random access preamble 412, the random access response 414, and the RRC connection complete message 416 requires the correct TDD configuration information. Also, the UE needs the eIMTA context of the target cell 404 in order to receive the dynamic TDD configuration information, the DL reference configuration, and power control information from the target cell 404.

One solution to address this issue may be for the target cell 404 to delay enabling eIMTA for the UE 410 until after the handover is complete. For example, in order to enable eIMTA for the UE 410, the target node 404 may transmit an additional RRC reconfiguration message to the UE 410 after receiving the RRC connection reconfiguration complete message 416. Additional details relating to this solution are described in greater detail below with reference to FIGS. 9 and 10. However, before turning to FIGS. 7 and 8, another solution may be considered with reference to FIG. 5, and additional issues relating to CoMP may be explored with reference to FIG. 6.

Figure 5:
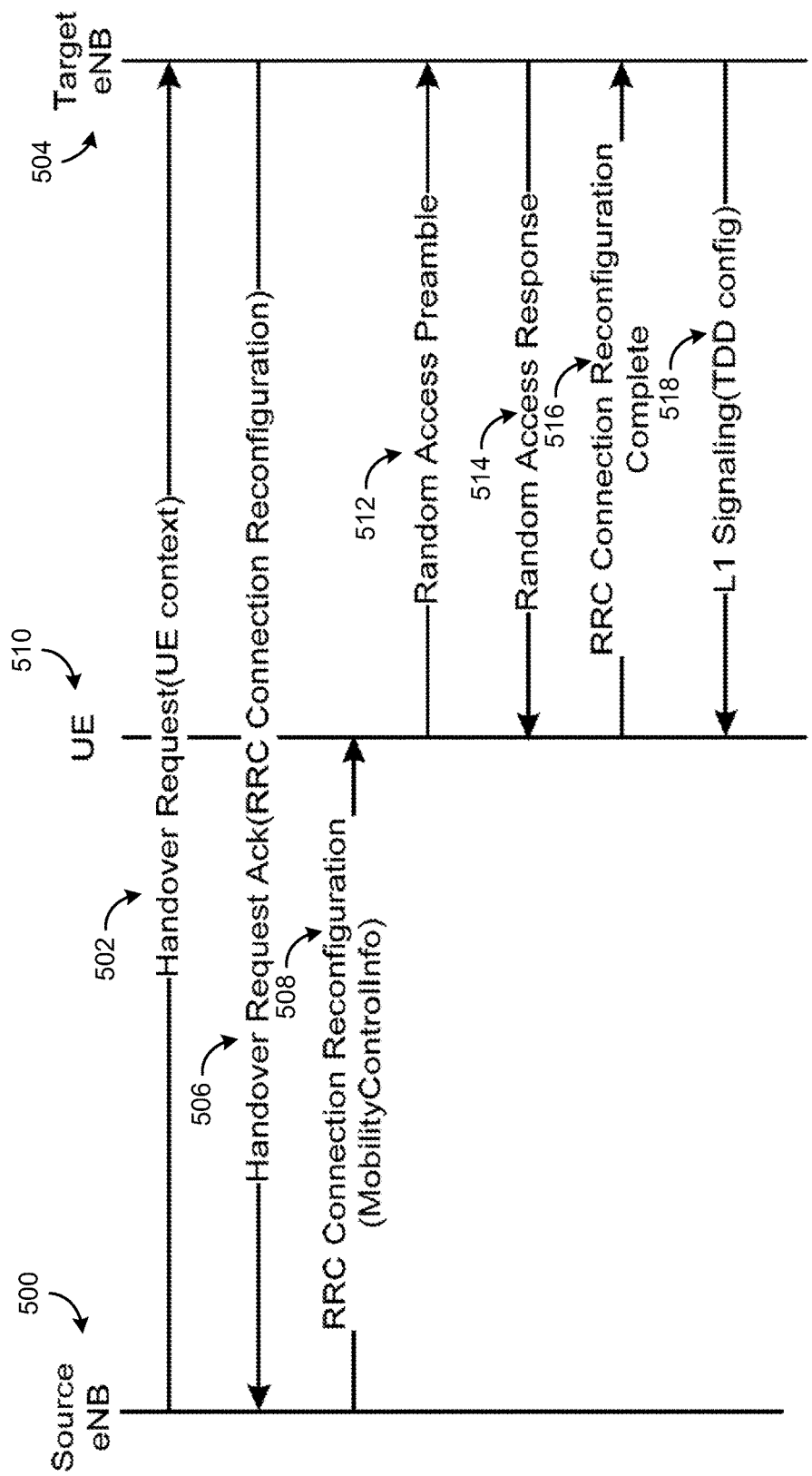
FIG. 5 is a timing diagram illustrating signaling during a handover procedure into an enhanced interference management and traffic adaption (eIMTA) enabled cell according to an aspect of the present disclosure.

FIG. 5 illustrates handover signaling to an eIMTA enabled target cell 504 that employs an additional or alternative solution that addresses issues relating to the handover to an eIMTA enabled target cell 504. It should be understood that the handover may be either intra E-UTRA (e.g., either X2 or S1 handover) or inter-RAT. FIG. 5 illustrates an example involving X2 handover.

In the example, the source cell 500, target cell 504, and UE 510 send and receive the same or similar types of messages as illustrated in FIG. 4. For example, the source cell 500 and the target cell 504 may exchange a handover request 502 and a handover command 506. Additionally, the source cell 500 may forward the handover command 506 to the UE 510 as an RRC connection reconfiguration message 508 containing mobility control information. Also, the UE 510 and the target cell 504 may exchange a random access preamble 512, a random access response 514, and an RRC connection complete message 516. However, according to this additional or alternative solution, the target cell 504 may include, in the handover command 506, eIMTA configuration information that allows the UE 510 to successfully receive L1 signaling 518 from the target cell 506.

By adding a new information element containing eIMTA configuration information into the mobility control information, the UE 510 may be able to avoid the issues mentioned above. For example, the eIMTA configuration information may include a group common RNTI and a group index to allow the UE 510 to receive the L1 signaling 518, even though the TDD configuration information in the handover command 506 may be invalid. Additionally, in the case of carrier aggregation, the target cell 504 may provide a carrier aggregation bitmap in the eIMTA configuration information to enable the UE 510 to differentiate new TDD configuration information of primary and secondary cells in the L1 signaling 518. Also, the eIMTA configuration information may include a DL reference configuration and/or eIMTA specific UL power control parameters. The UE 510 may follow the DL reference configuration to determine timeline of DL HARQ during and after handover.

The existing TDD configuration information in the handover command 506 may still be useful to the UE 510. For example, the target cell 504 may include the TDD configuration information to convey a default TDD configuration, which may be the same as TDD configuration information in SIB 1. Additionally, the UE 510 may use the TDD configuration information to determine the PRACH resource, and the UE 510 may follow the TDD configuration information until the new TDD configuration information is received by the L1 signaling 518 after handover. Additional details relating to this additional or alternative solution are described below with reference to FIGS. 9 and 10. However, before turning to FIGS. 9 and 10, additional issues relating to CoMP may be explored with reference to FIG. 6

Figure 6:
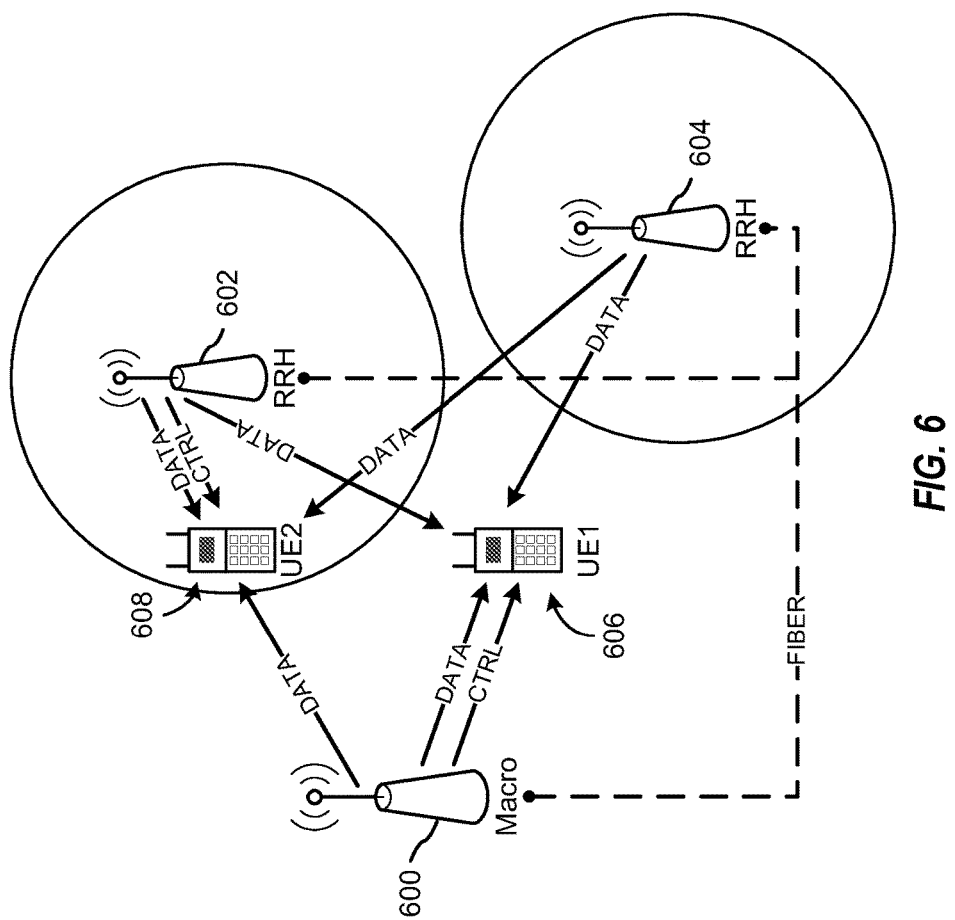
FIG. 6 is a block diagram illustrating a handover into a CoMP 4 scenario enabled virtual cell according to an aspect of the present disclosure.

FIG. 6 explores additional issues arising in handover of UEs 606 and/or 608 to an eIMTA enabled target cell 600 in CoMP scenario 4. In a cell configured with CoMP scenario 4, the macro cells and any small cells, such as remote radio heads (RRH) are configured to have the same physical cell ID (PCI). Thus, with the same PCI the macro cells and small cells will have a common PDCCH control region. In this instance, the additional issues arise, in part, due to a lack of knowledge, on the part of the target cell 600, regarding which RRH, or virtual cell 602 or 604 is most proximate to the UE. Thus, during the handover preparation phase, the target cell 600 may be unable to properly set the eIMTA configuration information and CoMP parameters in the handover command. In particular, the target cell 600 may be unable to properly configure the required UE group index. For example, the Target eNB may not be able configure the group index required for the UE 606 or 608 to receive the explicit L1 signaling, since it is related to the remote radio head to which the UE 606 or 608 is most proximate. Solutions to these additional issues are described below with reference to FIGS. 7-18.

FIGS. 7 and 8 provide additional details relating to the first solution mentioned previously. For example, FIG. 7 illustrates a process for wireless communications carried out by a target cell that delays enabling eIMTA and CoMP for a UE until after handover. Additionally, FIG. 8 illustrates a process for wireless communications carried out by a UE during handover to a target cell that delays enabling eIMTA and CoMP for the UE until after handover.

Referring to FIG. 7, handover of a UE to a target cell is performed, at block 700, by the target cell. For example, the target cell may include, in a handover command, TDD configuration information for the UE to be used by the UE as a reference TDD configuration during the handover. In block 700, eIMTA and CoMP may not be used until the target cell enables it after the handover, so the target cell may be able to provide TDD configuration information in the handover command that remains valid for the UE throughout the handover. The, at block 702, the target cell may determine that the handover is complete upon receipt of the handover complete message from the UE. In response to the determination, at block 702, that the handover is complete, the target cell may enable, at block 704, eIMTA and CoMP for the UE by RCC connection reconfiguration.

Referring to FIG. 8, handover of a UE to a target cell is performed, at block 800, by a UE. In block 800, the UE may use TDD configuration information received in a handover command as a reference TDD configuration during the handover. Since the target cell may not use eIMTA and CoMP until the target cell enables it after the handover, the TDD configuration information may remain valid for the UE throughout the handover. At block 802, the UE may determine, upon transmission, by the UE, of a handover complete message to the target cell, that the handover is complete. In response to the determination that the handover is complete, the UE may respond, at block 804 to an RRC connection reconfiguration by the target cell to enable eIMTA and CoMP for the UE.

It should be appreciated that the first solution, described with reference to FIGS. 7 and 8, avoids all of the issues relating to eIMTA handover and CoMP scenario 4 handover. However, the first solution does not allow eIMTA or CoMP to be employed by the target cell until after handover. The additional or alternative solution, described below with reference to FIGS. 9 and 10, may permit the target cell to employ eIMTA during handover.

FIGS. 9 and 10 provide additional details relating to the additional or alternative solution mentioned previously. For example, FIG. 9 illustrates a process for wireless communications carried out by a target cell that provides eIMTA configuration information in a handover command. Additionally, FIG. 10 illustrates a process for wireless communications carried out by a UE during handover to a target cell that provides eIMTA configuration information in a handover command.

Referring to FIG. 9, a target cell may, in block 900, receive, from a source cell, a handover request to perform handover of a UE to the target cell. At block 902, the target cell may generate a handover command containing TDD configuration information and eIMTA configuration information, as described above. At block 904, the target cell may transmit the handover command to the source cell for forwarding thereof to the UE. At block 906, the target cell may determine that the handover is complete, as described above. At block 908, the target cell may transmit new TDD configuration information to the UE by L1 signaling after the handover is complete.

Referring to FIG. 10, a UE may receive, at block 1000, a handover command containing TDD configuration information and eIMTA configuration information. At block 1002, the UE may perform a handover of the UE to a target cell, including employing the TDD configuration information to determine a PRACH resource to be used by the UE during the handover. AT block 1004, the UE may determine that the handover is complete, as previously described. At block 1006, the UE may use the eIMTA configuration information to receive L1 signaling from the target cell after the handover is complete, and thus acquire new TDD configuration information.

It should be appreciate that the additional or alternative solution, described with reference to FIGS. 9 and 10, solves the issues arising due to eIMTA in the absence of CoMP scenario 4. However, some additional measures may be employed to solve the issues relating to CoMP scenario 4. These additional measures are described below with reference to FIGS. 11-18.

Figures 11, 12:
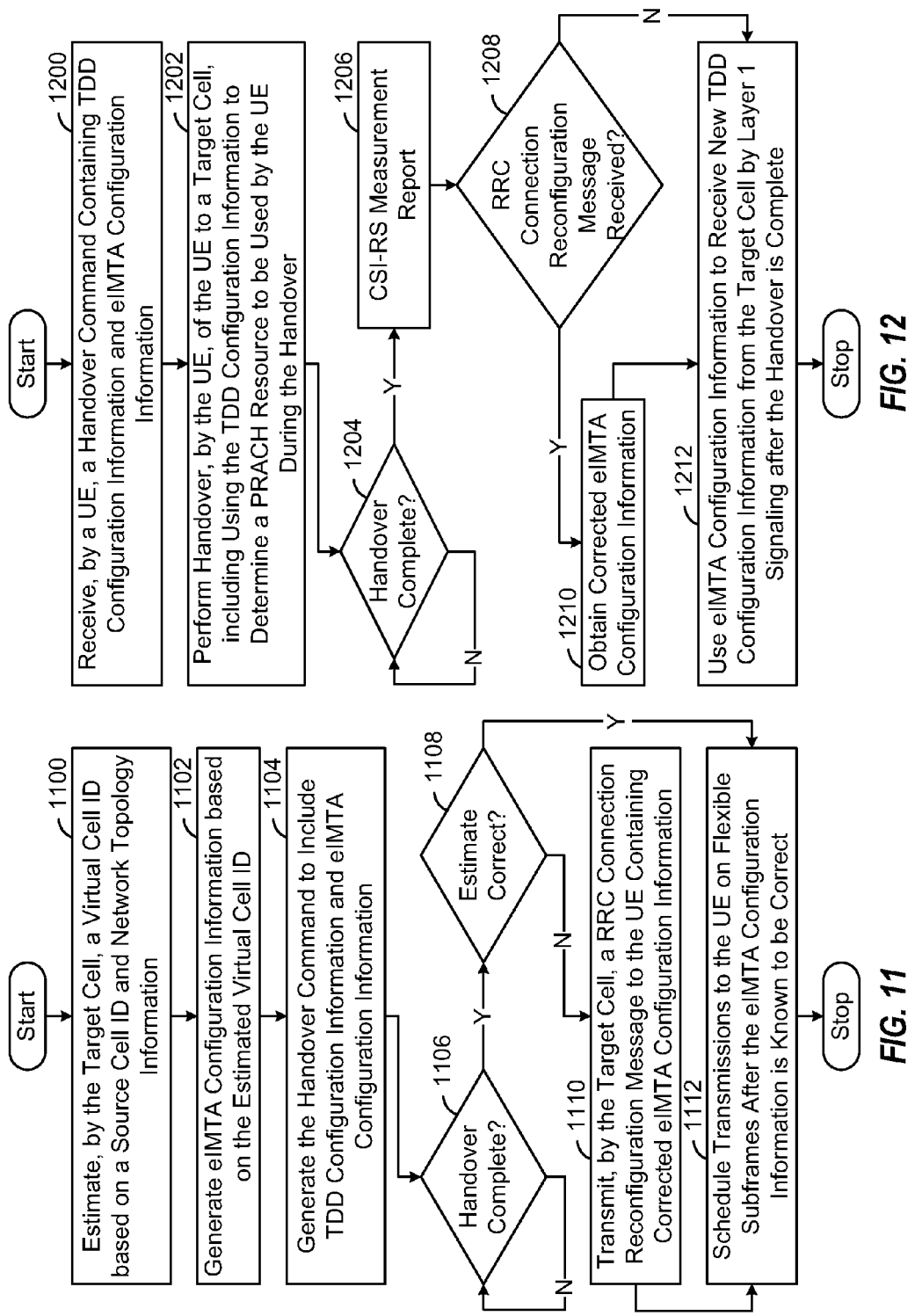
FIG. 11 is a block diagram illustrating example blocks of a wireless communication process according to an aspect of the present disclosure.
FIG. 12 is a block diagram illustrating example blocks of a wireless communication process according to an aspect of the present disclosure.

FIGS. 11 and 12 provide additional details of a solution that combines aspects of the first solution, described with reference to FIGS. 7 and 8, and the additional or alternative solution described above with reference to FIGS. 9 and 10. For example, FIG. 11 illustrates a process for wireless communications that may be carried out by a target cell that estimates a virtual cell identity, and that avoids scheduling traffic to the UE on virtual subframes until the target cell knows that the UE has the correct eIMTA configuration information. Also, FIG. 12 illustrates a process for wireless communications that may be carried out by a UE during handover to a target cell that estimates a virtual cell identity, and that avoids scheduling traffic to the UE on virtual subframes until the target cell knows that the UE has the correct eIMTA configuration information.

Referring to FIG. 11, a target cell may, at block 1100, estimate a virtual cell identity based on a source cell identity and network topology information. At block 1102, the target cell may generate eIMTA configuration information based on the estimated virtual cell identity. At block 1104, the target cell may generate a handover command that includes TDD configuration information and the eIMTA configuration information. At block 1106, the target cell may determine that the handover is complete, as previously described. At block 1108, the target cell may determine whether the estimated virtual cell identity is correct. For example, after the UE arrives at the target cell, the target cell may, at block 1108, receive a CSI-RS measurement report from the UE, determine a correct virtual cell identity based on the measurement report, compare the correct virtual cell identity to the estimated virtual cell identity, and determine whether the estimated virtual cell identity is correct based on results of the comparison. In performing the comparison, the target cell may generate a second group index based on the correct virtual cell identity, and compare the second group index to a first group index generated from the estimated virtual cell identity. Alternatively or additionally, after the UE arrives at the target cell, the target cell may, at block 1108, make one or more measurements, such as measuring a sounding reference signal (SRS) of the UE, determine a correct virtual cell identity based on the one or more measurements, compare the correct virtual cell identity to the estimated virtual cell identity, and determine whether the estimated virtual cell identity is correct based on results of the comparison. In performing the comparison, the target cell may generate a second group index based on the correct virtual cell identity, and compare the second group index to a first group index generated from the estimated virtual cell identity. If the target cell determines, at block 1108, that the estimated virtual cell identity is incorrect, then the target cell may, at block 1110, transmit a RRC connection reconfiguration message to the UE that contains corrected eIMTA configuration information, such as the second group index. Then, at block 1112, the target cell may schedule transmissions to the UE on flexible subframes after it knows that the UE has the correct eIMTA configuration information. However, if the target cell determines, at block 1108, that the estimated virtual cell identity is correct, then the target cell may, at block 1112, schedule transmissions to the UE on flexible subframes after it knows that the UE has the correct eIMTA configuration information. For example, the target cell may schedule transmissions on the flexible subframes in response to determining that the second group index matches the first group index, or in response to the UE acknowledging receipt of the second group index.

Referring to FIG. 12, at block 1200, a UE may receive a handover command containing TDD configuration information and eIMTA configuration information. At block 1200, the UE may perform a handover of the UE to a target cell, including using the TDD configuration information to determine a PRACH resource to be used by the UE during the handover. At block 1204, the UE may determine that the handover is complete, as previously described. At block 1206, the UE may, after the handover is complete, perform CSI-RS measurements of virtual cells of the target cell, generate a CSI-RS measurement report, and transmit the CSI-RS measurement report to the target cell. At block 1208, the UE may determine whether it has received a RRC connection reconfiguration message from the target cell. If the UE determines, at block 1208, that a RRC reconfiguration message has not been received from the target cell after handover, then the UE may, at block 1212, employ the eIMTA configuration information that it received in the handover command to receive new TDD configuration information from the target cell by L1 signaling. However, if the UE determines, at block 1208, that it has received a RRC connection reconfiguration message from the target cell, then the UE may, at block 1210, obtain corrected eIMTA configuration information from the RRC connection reconfiguration message that it received from the target cell after the handover was completed. Then, at block 1212, the UE may employ the corrected eIMTA configuration information that it received in the RRC connection reconfiguration message to receive new TDD configuration information from the target cell by L1 signaling.

It should be appreciated that the solution described with reference to FIGS. 11 and 12 allows the eIMTA and CoMP 4 scenario enabled target cell to enable eIMTA and CoMP for the UE during handover, but avoids scheduling transmissions to the UE on flexible subframes until it knows that the UE has the correct eIMTA configuration information. Compared to the first solution, this alternative allows the target cell to avoid, on some occasions, having to send a RRC connection reconfiguration message to the UE after handover. Other solutions, described below with reference to FIGS. 13-18, enable the target cell to know the correct virtual cell identity during the handover preparation phase. These solutions permit the target cell to enable eIMTA and CoMP for the UE during handover, and to avoid having to send an RRC connection reconfiguration message to the UE after the handover is complete. These solutions also allow the target cell to schedule transmissions to the UE on flexible subframes during handover, if desired. For example, FIG. 13 illustrates a solution that involves the target cell measuring the sounding reference signal (SRS) of the UE, during the handover preparation phase, to determine the correct virtual cell identity. Additionally, FIGS. 14-16 illustrate a solution that involves measurement, by a UE, of channel state information-reference signals of virtual cells of the target cell before the handover is initiated. Also, FIGS. 17 and 18 illustrate an alternative solution that involves measurement, by a UE, of channel state information-reference signals of virtual cells of the target cell before the handover is initiated.

Referring to FIG. 13, a target cell may, at block 1300, receive, from a source cell, a handover request to perform handover of a UE to the target cell. At block 1302, the target cell may respond to the request, at block 1302, by starting a timer to guard measurement of a SS of the UE by the target cell, and then measuring the SRS of the UE at block 1304. The target cell may also determine, at block 1306, whether the timer expired before the measurement at block 1304, was completed. If the target cell determines, at block 1306, that the timer expired, then the target cell may restart the timer at block 1302, and measure again the SRS of the target cell at block 1304. However, if the target cell determines, at block 1306, that the timer did not expire, then the target cell may determine a virtual cell identity based on the measurement of the SRS. Then, at block 1310, the target cell may generate the eIMTA configuration information and include the eIMTA configuration information in the handover command.

Referring to FIG. 14, a source cell may, at block 1400, make a determination to transmit, to a target cell, a handover request to perform a handover of a UE to the target cell. At block 1402, the source cell may determine whether the target cell supports CoMP scenario 4. If the source cell determines, at block 1402, that the target cell does not support CoMP scenario 4, then the source cell may generate, at block 1404, a handover request, and may transmit, at block 1406, the handover request to the target cell. However, if the source cell determines, at block 1402, the at the target cell does support CoMP scenario 4, then the source cell may transmit, at block 1408, a request, to the UE, for the UE to measure CSI-RS of one or more virtual cells of the target cell. Then, at block 1410, the source cell may receive, from the UE, a CSI-RS measurement report from the UE. At block 1412, the source cell may determine a virtual cell identity based on the CSI RS measurement report. At block 1414, the source cell may generate a handover request to include the virtual cell identity, and may transmit the handover request, at block 1406, to the target cell.

Referring to FIG. 15, a UE may receive, from a source cell, a request to measure CSI-RS of one or more virtual cells of a target cell. At block 1502, the UE may measure CSI-RS of the one or more virtual cells of the target cell. At block 1504, the UE may generate a CSI-RS measurement report based on the measured CSI-RS of the one or more virtual cells of the target cell. At block 1506, the UE may transmit the CSI-RS measurement report to the source cell.

Referring to FIG. 16, a target cell may receive, at block 1600, a handover request to perform a handover of a UE to the target cell, and the request may contain a virtual cell identity. At block 1602, the target cell may generate eIMTA configuration information based on the virtual cell identity and include the eIMTA configuration information in the handover command.

Referring to FIG. 17, a source cell may, at block 1700, make a determination to transmit, to a target cell, a handover request to perform a handover of a UE to the target cell. At block 1702, the source cell may determine whether the target cell supports CoMP scenario 4. If the source cell determines, at block 1702, that the target cell does not support CoMP scenario 4, then the source cell may generate, at block 1704, a handover request, and may transmit, at block 1706, the handover request to the target cell. However, if the source cell determines, at block 1702, that the target cell does support CoMP scenario 4, then the source cell may transmit, at block 1708, a request, to the UE, for the UE to measure CSI-RS of one or more virtual cells of the target cell. Then, at block 1710, the source cell may receive, from the UE, a CSI-RS measurement report from the UE. At block 1712, the source cell may generate a handover request to include at least part of the CSI-RS measurement report, and may transmit the handover request, at block 1706, to the target cell.

Referring to FIG. 18, a target cell may receive, at block 1800, a handover request to perform a handover of a UE to the target cell, and the request may contain at least part of a CSI-RS measurement report. At block 1802, the target cell may determine a virtual cell identity based on the at least part of the CSI RS measurement report. At block 1804, the target cell may generate eIMTA configuration information based on the virtual cell identity and include the eIMTA configuration information in the handover command.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of" at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, the method comprising:

generating enhanced interference mitigation and traffic adaptation (eIMTA) configuration information, by a target cell, for a user equipment (UE) to receive first Time Division Duplex (TDD) configuration information from the target cell by Layer 1 signaling;

generating, by the target cell, a handover command to perform a handover of the UE to the target cell, wherein the handover command contains second TDD configuration information and the eIMTA configuration information;

transmitting, by the target cell, the handover command; and transmitting, by the target cell, the first TDD configuration information to the UE by Layer 1 signaling after the handover is complete.

2. The method of claim 1, wherein the eIMTA configuration information includes one of:

a group common radio network temporary identifier (RNTI);

a group index; or a carrier aggregation bitmap for the UE to differentiate cells in the Layer 1 signaling.

3. The method of claim 1, wherein the eIMTA configuration information includes at least one of:

a downlink reference configuration for the UE to determine timeline of downlink hybrid automatic repeat request (HARQ) signaling during and after handover; or eIMTA specific uplink power control parameters.

4. The method of claim 1, wherein generating the eIMTA configuration information includes:

estimating a virtual cell identity based on a source cell identity and wireless network topology information; and generating the eIMTA configuration information based on the estimated virtual cell identity.

5. The method of claim 4, further comprising:

determining, after the handover is complete, that the estimated virtual cell identity is incorrect; and transmitting, in response to the determination that the estimated virtual cell identity is incorrect, a radio resource control (RRC) connection reconfiguration message, to the UE, that contains corrected eIMTA configuration information.

6. The method of claim 5, further comprising:

receiving, after the handover is complete, a message from the UE containing a Channel State Information-Reference Signal (CSI-RS) measurement report, wherein the determining that the estimated virtual cell identity is incorrect is based at least in part on the CSI-RS measurement report.

7. The method of claim 5, further comprising:
measuring, after the handover is complete, a sounding reference signal (SRS) of the UE,
wherein the determining that the estimated virtual cell identity is incorrect is based at least in part on results of the measuring the SRS of the UE.

8. The method of claim 5, further comprising:
scheduling transmissions to the UE on flexible subframes after transmission of the corrected eIMTA configuration information.

9. The method of claim 5, further comprising:
determining that the estimated virtual cell identity is correct; and
scheduling transmissions to the UE on flexible subframes after the determining that the estimated virtual cell identity is correct.

10. The method of claim 9, further comprising:
receiving, after the handover is complete, a message from the UE containing a Channel State Information-Reference Signal (CSI-RS) measurement report,
wherein the determining that the estimated virtual cell identity is correct is based at least in part on the CSI-RS measurement report.

11. The method of claim 9, further comprising:
measuring, after the handover is complete, a sounding reference signal (SRS) of the UE,
wherein the determining that the estimated virtual cell identity is correct is based at least in part on results of the measuring the SRS of the UE.

12. The method of claim 1, further comprising:
measuring, by the target cell, a sounding reference signal (SRS) of the UE; and
determining a virtual cell identity based on the measuring of the SRS of the UE,
wherein the generating the eIMTA configuration information includes generating the eIMTA configuration information based on the determined virtual cell identity.

13. The method of claim 12, further comprising:
employing a timer guard the measuring the SRS of the UE.

14. The method of claim 1, further comprising:
receiving, by the target cell, a handover request to perform the handover of the UE to the target cell, wherein the handover request contains a virtual cell identity,
wherein the generating the eIMTA configuration information includes generating the eIMTA configuration information based on the virtual cell identity contained in the handover request.

15. The method of claim 1, further comprising:
receiving, by the target cell, a handover request to perform the handover of the UE to the target cell, wherein the handover request contains at least part of a Channel State Information-Reference Signal (CSI-RS) measurement report that is based on measured CSI-RS of one or more virtual cells of the target cell; and
determining, by the target cell, a virtual cell identity based on the at least part of the CSI-RS measurement report,
wherein the generating the eIMTA configuration information includes generating the eIMTA configuration information based on the determined virtual cell identity.

16. A method for wireless communications, the method comprising:
receiving, by a user equipment (UE), a handover command to perform a handover of the UE to a target cell, wherein the handover command contains second Time Division Duplex (TDD) configuration information and enhanced interference mitigation and traffic adaptation (eIMTA) configuration information for the UE to receive first TDD configuration information from the target cell by Layer 1 signaling;
employing, by the UE, the second TDD configuration information to determine a Physical Random Access Channel (PRACH) resource to be used by the UE during the handover; and
employing, by the UE, the eIMTA configuration information to receive the first TDD configuration information from the target cell by the Layer 1 signaling after the handover is complete.

17. The method of claim 16, further comprising:
receiving, by the UE, after the handover is complete, a radio resource control (RRC) connection reconfiguration message, from the target cell, that contains corrected eIMTA configuration information,
wherein employing the eIMTA configuration information to receive the first TDD configuration information includes employing the corrected eIMTA configuration information to receive the first TDD configuration information.

18. An apparatus for wireless communications, the apparatus comprising:
means for generating enhanced interference mitigation and traffic adaptation (eIMTA) configuration information, by a target cell, for a user equipment (UE) to receive first Time Division Duplex (TDD) configuration information from the target cell by Layer 1 signaling;
means for generating, by the target cell, a handover command to perform a handover of the UE to the target cell, wherein the handover command contains second TDD configuration information and the eIMTA configuration information;
means for transmitting, by the target cell, the handover command; and
means for transmitting, by the target cell, the first TDD configuration information to the UE by Layer 1 signaling after the handover is complete.

19. The apparatus of claim 18, wherein the eIMTA configuration information includes one of:
a group common radio network temporary identifier (RNTI);
a group index; or
a carrier aggregation bitmap for the UE to differentiate cells in the Layer 1 signaling.

20. The apparatus of claim 18, wherein the eIMTA configuration information includes at least one of:
a downlink reference configuration for the UE to determine timeline of downlink hybrid automatic repeat request (HARQ) signaling during and after handover; or
eIMTA specific uplink power control parameters.

21. The apparatus of claim 18, wherein the means for generating the eIMTA configuration information includes:
means for estimating a virtual cell identity based on a source cell identity and wireless network topology information;
means for generating the eIMTA configuration information based on the estimated virtual cell identity;
means for determining, after the handover is complete, that the estimated virtual cell identity is incorrect;
means for transmitting, in response to the determination that the estimated virtual cell identity is incorrect, a radio resource control (RRC) connection reconfiguration message, to the UE, that contains corrected eIMTA configuration information;

means for receiving, after the handover is complete, a message from the UE containing a Channel State Information-Reference Signal (CSI-RS) measurement report, wherein the means for determining that the estimated virtual cell identity is incorrect includes means for determining that the estimated virtual cell identity is incorrect based at least in part on the CSI-RS measurement report.

22. The apparatus of claim 21, further comprising:

means for measuring, after the handover is complete, a sounding reference signal (SRS) of the UE, wherein the means for determining that the estimated virtual cell identity is incorrect includes the means for determining that the estimated virtual cell identity is incorrect based at least in part on results of the measuring the SRS of the UE.

23. The apparatus of claim 21, further comprising:

means for scheduling transmissions to the UE on flexible subframes after transmission of the corrected eIMTA configuration information.

24. The apparatus of claim 21, further comprising:

means for determining that the estimated virtual cell identity is correct; and means for scheduling transmissions to the UE on flexible subframes after the determining that the estimated virtual cell identity is correct.

25. The apparatus of claim 24, further comprising:

means for receiving, after the handover is complete, a message from the UE containing a Channel State Information-Reference Signal (CSI-RS) measurement report, wherein the means for determining that the estimated virtual cell identity is correct includes means for determining that the estimated virtual cell identity is correct based at least in part on the CSI-RS measurement report.

26. The apparatus of claim 24, further comprising:

means for measuring, after the handover is complete, a sounding reference signal (SRS) of the UE, wherein the means for determining that the estimated virtual cell identity is correct includes means for determining that the estimated virtual cell identity is correct based at least in part on results of the measuring the SRS of the UE.

27. The apparatus of claim 18, further comprising:

means for measuring, by the target cell, a sounding reference signal (SRS) of the UE;

means for employing a timer to guard the measurement of the SRS of the UE; and means for determining a virtual cell identity based on the measurement of the SRS of the UE, wherein the means for generating the eIMTA configuration information includes means for generating the eIMTA configuration information based on the determined virtual cell identity.

28. The apparatus of claim 18, further comprising:

means for receiving, by the target cell, a handover request to perform the handover of the UE to the target cell, wherein the handover request contains a virtual cell identity, wherein the means for generating the eIMTA configuration information includes means for generating the eIMTA configuration information based on the virtual cell identity contained in the handover request.

29. The apparatus of claim 18, further comprising:

means for receiving, by the target cell, a handover request to perform the handover of the UE to the target cell, wherein the handover request contains at least part of a Channel State Information-Reference Signal (CSI-RS) measurement report that is based on measured CSI-RS of one or more virtual cells of the target cell; and means for determining, by the target cell, a virtual cell identity based on the at least part of the CSI-RS measurement report, wherein the means for generating the eIMTA configuration information includes means for generating the eIMTA configuration information based on the determined virtual cell identity.

30. An apparatus configured for wireless communication, comprising:

at least one processor; and a memory coupled to said at least one processor, wherein the at least one processor is configured to:

generate enhanced interference mitigation and traffic adaptation (eIMTA) configuration information, by a target cell, for a user equipment (UE) to receive first Time Division Duplex (TDD) configuration information from the target cell by Layer 1 signaling;

generate, by the target cell, a handover command to perform a handover of the UE to the target cell, wherein the handover command contains second TDD configuration information and the eIMTA configuration information;

transmit, by the target cell, the handover command; and transmit, by the target cell, the first TDD configuration information to the UE by Layer 1 signaling after the handover is complete.

* * * * *